(12) United States Patent
Hyypio

(10) Patent No.: US 9,537,350 B2
(45) Date of Patent: Jan. 3, 2017

(54) SWITCH-MODE POWER SUPPLY WITH A DUAL PRIMARY TRANSFORMER

(71) Applicant: Regal Beloit America, Inc., Beloit, WI (US)

(72) Inventor: David Bruce Hyypio, Weston, WI (US)

(73) Assignee: Regal Beloit America, Inc., Beloit, WI (US)

( * ) Notice: Subject to any disclaimer, the term of this patent is extended or adjusted under 35 U.S.C. 154(b) by 485 days.

(21) Appl. No.: 13/842,576

(22) Filed: Mar. 15, 2013

(65) Prior Publication Data

US 2014/0265582 A1  Sep. 18, 2014

(51) Int. Cl.
| | | |
|---|---|---|
| H02M 1/00 | (2006.01) | |
| H02J 9/06 | (2006.01) | |
| H02M 1/10 | (2006.01) | |
| H02M 3/335 | (2006.01) | |

(52) U.S. Cl.
CPC ............... *H02J 9/061* (2013.01); *H02M 1/10* (2013.01); *H02M 3/33569* (2013.01); *H02J 2009/067* (2013.01); *Y10T 307/549* (2015.04)

(58) Field of Classification Search
CPC ...... H02M 1/00; H02M 1/10; H02M 3/33596; H02J 9/061; H02J 2009/067
See application file for complete search history.

(56) References Cited

U.S. PATENT DOCUMENTS

| | | | |
|---|---|---|---|
| 3,873,846 A * | 3/1975 | Morio | ..................... H02M 1/10 307/23 |
| 4,044,296 A | 8/1977 | Dhyanchand et al. | |
| 4,300,130 A | 11/1981 | Fotheringham | |
| 4,786,853 A | 11/1988 | VanMarren | |
| 4,890,210 A | 12/1989 | Myers | |
| 5,237,140 A * | 8/1993 | Akazawa | ................ H01F 38/08 219/716 |
| 5,414,610 A * | 5/1995 | Brainard | ........... H02M 3/33569 363/21.15 |
| 6,134,125 A * | 10/2000 | Wenzel | ................. H02M 3/335 363/142 |
| 6,815,934 B2 | 11/2004 | Colley | |
| 7,400,063 B2 | 7/2008 | Iwashita | |
| 2004/0257835 A1* | 12/2004 | Lanni | ..................... H02M 1/10 363/20 |
| 2006/0232069 A1 | 10/2006 | Lim et al. | |

(Continued)

FOREIGN PATENT DOCUMENTS

EP        0475296 B1    7/1995

OTHER PUBLICATIONS

ISR/WO PCT/US14/23332 filed Mar. 11, 2014 mailed Jul. 28, 2014; 24 pages.

*Primary Examiner* — Rexford Barnie
*Assistant Examiner* — Terrence Willoughby
(74) *Attorney, Agent, or Firm* — Armstrong Teasdale LLP

(57) ABSTRACT

A switch-mode power supply that includes a transformer coupled to an alternating current (AC) power source and a direct current (DC) power source, wherein the AC power source is electrically isolated from the DC power source. The switch-mode power supply further includes a first controller configured to regulate a first voltage output from the AC power source, and a second controller configured to regulate a second voltage output from the DC power source when the transformer is not receiving power from the AC output.

20 Claims, 2 Drawing Sheets

(56) References Cited

U.S. PATENT DOCUMENTS

| | | | |
|---|---|---|---|
| 2008/0231236 A1* | 9/2008 | Watanabe | H02J 7/0006 |
| | | | 320/150 |
| 2009/0125579 A1 | 5/2009 | Saillet et al. | |
| 2011/0089911 A1 | 4/2011 | Loisel et al. | |
| 2012/0119583 A1* | 5/2012 | Allfather | H02J 9/062 |
| | | | 307/72 |
| 2012/0217808 A1* | 8/2012 | Richardson | H02J 9/06 |
| | | | 307/64 |
| 2012/0250364 A1 | 10/2012 | Mayell | |

* cited by examiner

SWITCH-MODE POWER SUPPLY WITH A DUAL PRIMARY TRANSFORMER

BACKGROUND OF THE INVENTION

The subject matter described herein relates generally to electric generators, and more specifically, to methods, systems, and apparatus that enable a switch-mode power supply to have a dual primary transformer that derives a low voltage power supply from two different power sources of disparate voltage ratings.

A switched-mode power supply (SMPS) is an electronic power supply that incorporates a switching regulator to convert electrical power efficiently. Like other power supplies, an SMPS transfers power from a source, like mains power, to a load while converting voltage and current characteristics. An SMPS is usually employed to efficiently provide a regulated output voltage, typically at a level different from an input voltage.

Electronic voltage regulators are used to regulate the output voltage of a brushless synchronous generator by controlling the level of current in an exciter field of the generator. The power source for the excitation is most often derived from a relatively small permanent magnet generator (PMG) that is part of a larger, main generator. However, because a rotor of the PMG is mounted to the same shaft as a rotor of the main generator, it is required that a prime mover of the main generator be rotating in order for the electronic voltage regulator to receive input power. As such, if the prime mover of the main generator is not rotating, the electronic voltage regulator module is unable to perform system monitoring (e.g., temperature monitoring) or perform communication with other system elements because power is not being supplied to the electronic voltage regulator. Thus, the electronic voltage regulator module cannot perform system monitoring nor communication functions until the prime mover begins rotating and power is once again provided to the electronic voltage regulator.

BRIEF DESCRIPTION OF THE INVENTION

In one aspect, a switch-mode power supply is provided. The switch-mode power supply includes a transformer coupled to an alternating current (AC) power source and a direct current (DC) power source, wherein the AC power source is electrically isolated from the DC power source. The switch-mode power supply further includes a first controller configured to regulate a first voltage output from the AC power source, and a second controller configured to regulate a second voltage output from the DC power source when the transformer is not receiving power from the AC output.

In another aspect, a system that includes an alternating current (AC) power source, a direct current (DC) power source, and a transformer is provided. The transformer is coupled to the AC power source and the DC power source, wherein the AC power source is electrically isolated from the DC power source. The transformer includes a first controller configured to regulate a first voltage output from the AC power source, and a second controller configured to regulate a second voltage output from the DC power source when the transformer is not receiving power from the AC output.

In yet another aspect, a transformer is provided. The transformer is coupled to an alternating current (AC) power source and a direct current (DC) power source, wherein the AC power source being electrically isolated from the DC power source. The transformer includes a first controller configured to regulate a first voltage output from the AC power source, and a second controller configured to regulate a second voltage output from the DC power source when the transformer is not receiving power from the AC output.

DETAILED DESCRIPTION OF THE INVENTION

Figure 1:
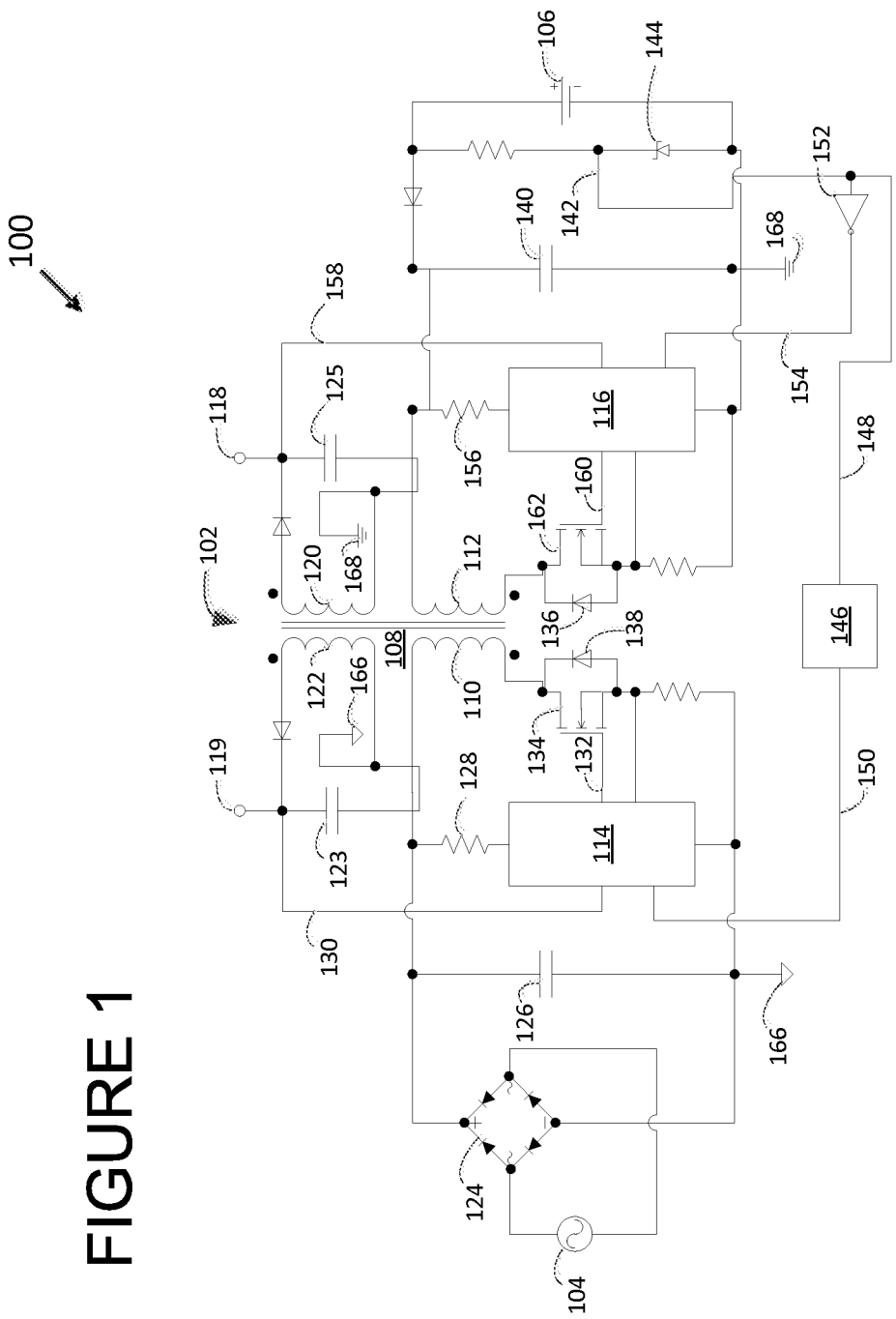
FIG. 1 is a schematic diagram of a system that includes a switch-mode power supply coupled to an alternating current power source and a direct current power source.

The methods, systems, and apparatus described herein facilitate providing a switch-mode power supply with a dual primary transformer such that power can be supplied to an electronic voltage regulator even if power is not being received from an alternating current (AC) power source. Electronics power supply cost is reduced by requiring only one transformer to perform the necessary electrical isolation and voltage transformation from either the AC power source or the DC power source.

Embodiments of the present disclosure enable an electronic voltage regulator to perform temperature monitoring (or other system variable monitoring) and to communicate this monitoring data over a communication network, even when an AC power source, such as a generator, is not rotating. As such, the present disclosure enables a switch-mode power supply to power electronics from either a relatively high voltage of a permanent magnet generator (PMG) if the PMG is rotating, or from a DC power source, such as a 12 volt or 24 volt battery, if the PMG is at rest. Further, the present disclosure achieves this with only one transformer. This idea can be extended to other applications other than voltage regulators where transformation and isolation from multiple power sources of disparate voltage ratings are used.

Further, when the additional cost or physical size impact of a PMG is undesirable in an excitation system of a particular AC power source, such as a brushless synchronous generators, a "shunt powered" voltage regulator is often used. With such a voltage regulator, the source of excitation power used to drive current into an exciter field is derived directly from the output voltage of the generator itself. The power input to the regulator is connected in parallel or in "shunt" with the main output of the generator. During the start-up process of such an excitation system, the regulator may be required to drive a current into the exciter even when a very low voltage has developed across the output of the main generator. Such a requirement can be viewed as a "bootstrapping" operation, whereby the regulator uses a small amount of residual voltage available at the generator output and converts it to a DC excitation current of sufficient amplitude to build up the generator voltage. Such a process is regenerative and usually works except in cases where the residual voltage is simply too low. In such cases, the exciter field can be "flashed" by temporarily connecting a 12 volt or 24 volt battery across it. Such a flashing action will induce enough residual magnetism in an exciter field magnetic core to successfully bootstrap the voltage when using a shunt-connected regulator. Prior art circuitry used for exciter field flashing is typically complex and bulky (usually made up of manual switches and electromechanical relays). Embodiments of the present disclosure automatically generate a source of stored energy that is derived from a battery, but is also electrically isolated from the battery. This stored energy is used to flash the exciter circuit, and once generator voltage build-up is initiated, the electronic voltage regulator is enabled to seamlessly assume control of the voltage regulator process, without the need of electromechanical relays or switches.

FIG. 1 is a schematic diagram of a system 100 that includes a switch-mode power supply 102 coupled to an alternating current (AC) power source 104 and a direct current (DC) power source 106. Switch mode power supply 100 includes a transformer 108 (e.g., a dual primary flyback transformer). Primary windings 110 and 112 of transformer 108 are each driven in a conventional manner, each with its own switch-mode control circuit, 114 and 116. A main output 118 of switch-mode power supply 100 is derived from transformer secondary winding 120. Main output 118 is a primary source of low voltage power (e.g., between 3.3 volts and 15 volts) for utilization by the control electronics of the voltage regulator 202 described below with respect to FIG. 2. From main output 118, several other power supply voltages may be derived by the use of downstream linear or switch-mode voltage converters (not shown).

Alternating current (AC) power source 104 may be a permanent magnet generator (PMG) or a brushless synchronous generator that provides a voltage, for example, between 100 volts to 300 volts. Direct current (DC) power source 106 may be a DC battery with a voltage of, for example, 8 volts to 32 volts. Embodiments of the present disclosure enable either AC power source 104 or DC power source 106 to drive one of primary windings 110 and 112 of transformer 108.

With respect to AC power source 104, a bridge rectifier 124 converts an alternating current of AC power source 104 to a direct current. Filter capacitor 126 smoothes the voltage ripples of the output of bridge rectifier 124. Resistor 128 provides switch-mode control circuit 114 with a small amount of bias current which is necessary for switch-mode control circuit 114 to initiate its control function. Switch-mode control circuit 114 accepts a feedback voltage signal 130 from the rectified and filtered output of tertiary winding 122. The regulating action of switch-mode control circuit 114 drives a gate voltage signal 132 in a pulse-width modulated fashion in such a way as to cause feedback voltage signal 130 to match an internal reference voltage. The topology of primary winding 110 and secondary winding 120 and tertiary winding 122 are that of the flyback converter well-known to those skilled in the art of switch-mode power supply design. When current in primary winding 110 is interrupted by transistor 134, the magnetic coupling between primary winding 110, secondary winding 120, and tertiary winding 122 causes a flyback voltage to appear at secondary windings 120 and tertiary winding 122, which in turn builds up a charge at capacitors 123 and 125. Thus, secondary winding 120 develops a DC voltage on capacitor 125 (e.g., 5 volts) and tertiary winding 122 develops a DC voltages on capacitor 123 (e.g., 15 volts). Voltage from capacitor 123 are thereafter sensed by feedback voltage signal 130, which is fed to switch-mode control circuit 114. Switch-mode control circuit 114 controls gating of transistor 134 to ensure that a desired voltage is produced at auxiliary output 119. In addition to providing voltage feedback, signal 130 may be used to provide circuit power to switch-mode control circuit 114. By virtue of regulating voltage at auxiliary output 119, the flyback voltage action of secondary winding 120 produces a DC voltage across output capacitor 125. Transformer 108 turns ratio is so designed that main output 118 produces a proper utilization voltage (e.g., 5 volts) when auxiliary output 119 is regulated to its designed set-point value (e.g., 15 volts). During the active, or ON phase of transistor 134, a voltage is produced at primary winding 112 due to magnetic coupling of primary windings 110 and 112. The polarity of the voltage at primary winding 112 during the ON phase of transistor 134 forward biases diode 136 and causes a DC voltage to build up on capacitor 140. This action will be recognized to those skilled in the art of switch-mode power supply design as that of a forward converter. The DC voltage produced across capacitor 140 is available for utilization in the electronics module if desired. Further, the turns ratios of primary windings 110 and 112 are such that secondary winding 120 and tertiary winding 122 receive the same amount of voltage on flyback voltage conversion from either AC power source 104 or DC power source 106.

It is not desirable for switch-mode control circuits 114 and 116 to be active at the same time. Rather, only control circuit 116 is active when DC power source 106 is connected. This permits an electronic module (not shown) supplied by main output 118 to be active even when AC power source 104 is not active, for example, when AC power source 104 is a PMG at a standstill. The presence of DC power source 106 produces a logic-level signal 142 across voltage clamping diode 144. Signal 142 feeds the input of interlock signal isolator 146. Interlock signal isolator 146 provides electrical isolation between signal 148 and signal 150 while passing the interlock logic information to switch-mode control circuit 114. Signal 150 is fed into the SHUTDOWN input of switch-mode control circuit 114, deactivating switch-mode control circuit 114 when DC power source 106 is present. When DC power source 106 is not present, a zero voltage level is present at signal 142. Signal 142 is fed to inverting buffer 152 and its output signal 154 is fed into the SHUTDOWN input of switch-mode control circuit 116, deactivating switch-mode control circuit 116. In one embodiment, a selection of a power source is automatic based on the presence or absence of a rotation from a main generator associated with the PMG.

With respect to DC power source 106, filter capacitor 140 acts as a bypass energy source to DC power source 106. Resistor 156 provides switch-mode control circuit 116 with a small amount of bias current which is necessary for switch-mode control circuit 116 to initiate its control function. Switch-mode control circuit 116 accepts a feedback signal 158 from the rectified and filtered output of secondary winding 120. The regulating action of switch-mode control circuit 116 drives the gate voltage signal 160 in a pulse-width modulated fashion in such a way as to cause feedback signal 158 of main output 118 to match an internal reference voltage of control circuit 116 (e.g., 5 volts). The topology of primary winding 112 and secondary windings 120 and tertiary winding 122 are that of the flyback converter well-known to those skilled in the art of switch-mode power supply design. When current in primary winding 112 is interrupted by power transistor 162, the magnetic coupling between primary windings 112 and secondary winding 120 and tertiary winding 122 causes a flyback voltage to appear at secondary winding 120 and tertiary winding 122. The regulating action of switch-mode control circuit 116 ensures that the desired voltage is produced at main output 118. By virtue of regulating voltage at main output 118, the flyback voltage action of tertiary winding 122 produces a DC voltage across output capacitor 123. Transformer 108 turns ratio is so designed that auxiliary output 119 produces a proper utilization voltage (e.g., 15 volts) when main output 118 is regulated to its designed set-point value (e.g., 5 volts). During the active, or ON phase of transistor 162, a voltage is produced at primary winding 110 due to magnetic coupling of primary windings 110 and 112. The polarity of the voltage at primary winding 110 during the ON phase of transistor 162 forward biases diode 138 and causes a voltage to build up on capacitor 126. This action will be recognized to those skilled in the art of switch-mode power supply design as that of a forward converter. The DC voltage produced across capacitor 126 is available for utilization in the electronics module if desired. The forward converter action and turns ratio of transformer windings 110 and 112 are such that a DC voltage of several multiples of that of DC power source 106 may be developed across capacitor 126. In particular, the energy stored across capacitor 126 can be used as a source of flashing current to magnetize the exciter stator core in a brushless synchronous generator to assist in the voltage build-up process of a shunt-fed voltage regulator as described below with reference to FIG. 2.

Figure 2:
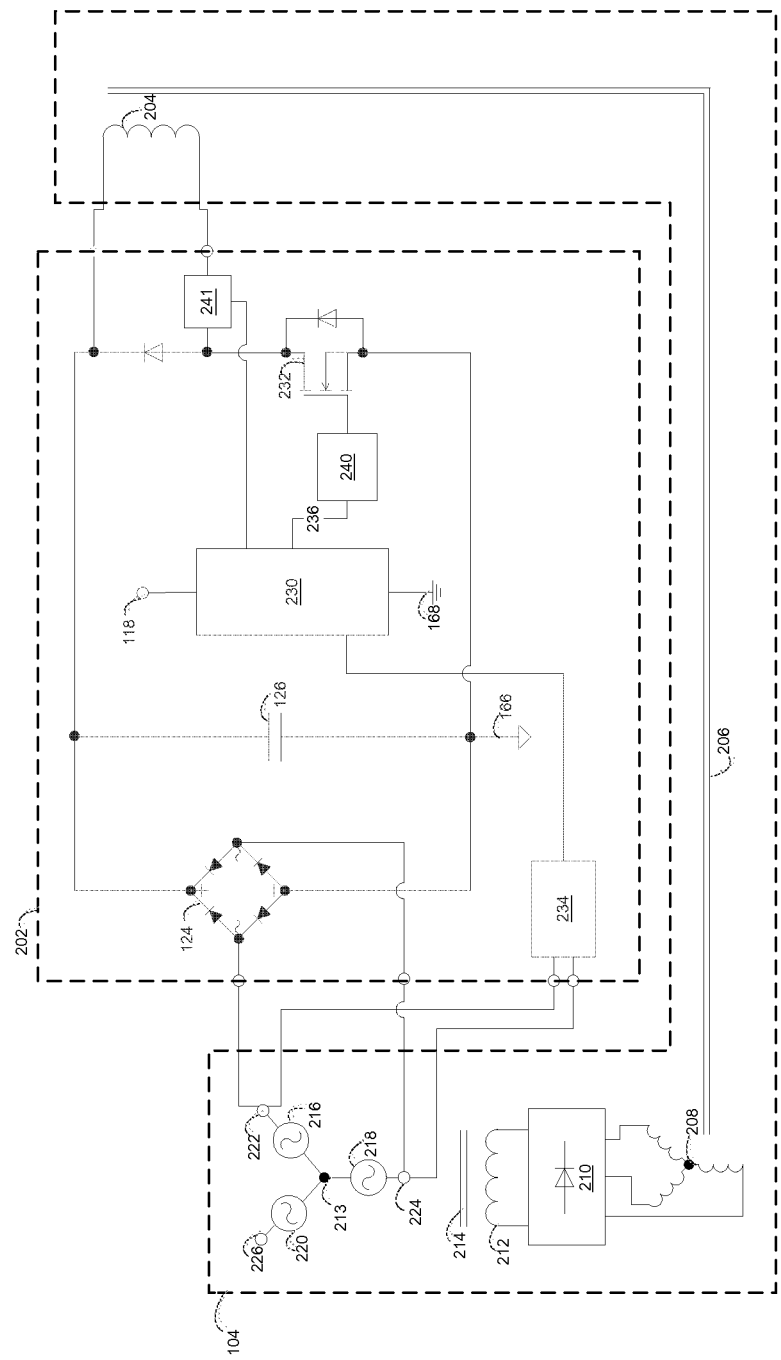
FIG. 2 a schematic diagram of a synchronous brushless generator with a shunt-connected voltage regulator.

With reference now to FIG. 2, a schematic diagram of a synchronous brushless generator (e.g., AC power source 104 as shown in FIG. 1) with a shunt-connected voltage regulator 202. Exciter field winding 204 is magnetically coupled by exciter magnetic core 206 to exciter rotor winding 208. Exciter rotor winding 208, exciter rotating rectifier 210, and generator main field winding 212 are mounted on a rotating shaft (not shown) of AC power source 104. The magnetic field produced by current in main field winding 212 is coupled to a main armature 213 of AC power source 104 by magnetic core 214. Mechanical rotation of a current-carrying main field winding 212 produces a rotating magnetic flux wave in magnetic core 214. Rotating flux wave magnetic core 214 induces alternating current voltage sources 216, 218, and 220 in armature 213 of AC power source 104. As can be deduced by the above explanation, current in exciter field winding 204 is a prerequisite to induce voltage at generator terminals 222, 224, 226.

During the voltage build-up phase of AC power source 104 when a rotation of a shaft (not shown) of AC power source 104 has commenced, there is no current existing in exciter field winding 204. There exists a relatively small voltage at generator terminals 222, 224, and 226 due to a residual magnetism in exciter core 206 and generator core 214. Conventionally, voltage regulator 202 is dependent upon residual magnetism of AC power source 104 to produce enough voltage across the output of rectifier 124 to enable voltage regulator control circuit 230 to operate. Output electronic switch 232 is required to be in an ON or CLOSED state to cause current to flow in exciter field winding 204. If insufficient voltage is available at the output of rectifier 124, control circuit 230 will fail to turn electronic switch 232 ON and voltage build-up of AC power source 104 will fail to happen. A conventional solution to the low residual voltage build-up problem described above has been addressed by "flashing" or temporarily connecting a battery (e.g., a 12 volt or a 24 volt battery) across exciter field winding 204. This process in normally a manual one used for relatively small, portable generators of the type used for standby or temporary sources of AC power. More complex switching circuits of varying complexity are sometimes built into the engine-generator sets that automatically detect the need for field flashing and perform an automated, temporary application of battery power to the exciter field winding 204. Such circuits require add-on equipment such as voltage sensing circuitry and electromechanical relays for application and removal of battery power to the exciter field winding. The brief application of current into the exciter field winding 204 usually induces sufficient residual magnetism to allow the shunt-connected voltage regulator 202 to successfully build up generator voltage.

Embodiments of the present disclosure overcome the failure-to-build voltage problem of shunt-connected voltage regulators through the implementation of a switch-mode power supply 100 shown in FIG. 1. As shown in FIGS. 1 and 2, rectifier 124 and capacitor 126 are common elements in both the power supply circuit of FIG. 1 and voltage regulator circuit 202 of FIG. 2. For illustrative purposes, a single phase AC power source 104 of FIG. 1 is replaced by a line-to-line voltage of a three-phase AC generator 104 in FIG. 2, while the remaining components of FIG. 1 remain intact.

Application of DC power source 106 produces a logic-level main output power supply 118 that is available for utilization by regulator control circuit 230. Regulator control circuit 230, having logic-level voltage 118 available, is enabled to monitor the status of AC power source 104 voltage with output of voltage attenuation circuit 234. Attenuation circuit 234 presents a very high input impedance (greater than one meg-ohm) to provide impedance isolation between AC power source 104 and regulator control circuit 230. By monitoring the status of a voltage of AC power source 104, regulator control circuit 230 can determine if AC power source 104 is rotating by monitoring a frequency of its residual voltage. Should regulator control circuit 230 determine that AC power source 104 is rotating, regulator control circuit 230 can begin pulsing an exciter current into exciter field winding 204 to begin the voltage build-up process. Conventionally, there would be an insufficient source of excitation energy if residual voltage of AC power source 104 was too low. However, embodiments of the present disclosure, with DC power source 106 connected, produce a stepped up voltage across capacitor 126, as a result of winding design of transformer 102 (shown in FIG. 1). The voltage produced across capacitor 126 by the power supply of FIG. 1 equates to an amount of stored energy that is available for the flashing of exciter field winding 204. Upon detection of generator rotation as described above, regulator control circuit 230 can apply current from the stored charge on capacitor 126 to exciter field winding 204 by controlling a gate signal 236 to electronic switch 232 through the gate signal opto-isolator 240. A Hall-effect linear current sensor with input-to-output galvanic isolation 241 or other suitable current sensor with electrical isolation is used to provide an exciter field winding current feedback signal to regulator control circuit 230 to enable control of current in exciter field winding 204.

As mentioned above, transformer 108 (shown in FIG. 1) provides an electrical isolation between DC power source 106 (shown in FIG. 1) and a voltage regulator circuit 202. This is shown by ground circuit reference 168 of the battery circuit and the circuit reference potential 166 derived from AC source 104 of both FIGS. 1 and 2. From FIG. 2, it is apparent that circuit reference potential 166 is derived from the DC rectified output of the high voltage AC terminal voltage of AC power source 104. The electrical isolation provided by transformer 102 (shown in FIG. 1), signal isolator 146 (shown in FIG. 1), attenuation circuit with impedance isolation (shown in FIG. 2), gate signal opto-isolator 240 (shown in FIG. 2) and Hall-effect linear current sensor with galvanic isolation 241 (shown in FIG. 2) are critical in conforming to safety codes that require electrical isolation between low voltage control circuits, such as those derived from DC power source 106, and high voltage power circuits, such as those derived from AC power source 104.

The methods, systems, and apparatus are not limited to the specific embodiments described herein, but rather, components of each apparatus, as well as steps of each method, may be utilized independently and separately from other components and steps described herein. Each component, and each method step, can also be used in combination with other components and/or method steps. Furthermore, although described herein with respect to an electric generator, the methods, systems, and apparatus described herein are applicable to all electric machines, including electric motors and electric generators.

Although specific features of various embodiments of the invention may be shown in some drawings and not in others, this is for convenience only. In accordance with the principles of the invention, any feature of a drawing may be referenced and/or claimed in combination with any feature of any other drawing.

When introducing elements/components/etc. of the systems and apparatus described and/or illustrated herein, the articles "a," "an," "the," and "said" are intended to mean that there are one or more of the element(s)/component(s)/etc. The terms "comprising," "including," and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A switch-mode power supply comprising:
    a transformer comprising a first primary winding coupled to an alternating current (AC) power source, a second primary winding coupled to a direct current (DC) power source, and a secondary winding configured to derive a main voltage output from the first and second primary windings, the AC power source including an AC generator that is electrically isolated from the DC power source;
    a first controller configured to drive the first primary winding to generate the main voltage output at the secondary winding using AC power generated by rotation of the AC generator, the main voltage output being electrically isolated from the AC power source;
    a second controller configured to drive the second primary winding to regulate the main voltage output at the secondary winding using DC power from the DC power source when the AC generator is not rotating, causing the transformer to not receive power from the AC power source; and
    an interlock signal isolator configured to generate an isolation barrier to electrically isolate the first controller from the second controller and the DC power source and allow logic information to pass therethrough, the interlock signal isolator configured to receive a first logic signal indicating that the DC power source is active and transmit a second logic signal across the isolation barrier commanding the first controller to deactivate while the DC power source is active.

2. The switch-mode power supply of claim 1, wherein the second controller is further configured to produce a higher main voltage output relative to a voltage input by the DC power source when the transformer is not receiving power from the AC output, the higher main voltage output being electrically isolated from the DC power source.

3. The switch-mode power supply of claim 1, wherein the DC power source is a battery that produces 12 or 24 volts.

4. The switch-mode power supply of claim 3, wherein the AC power source is a synchronous brushless generator that produces between 100-300 volts.

5. The switch-mode power supply of claim 4, further comprising a third controller configured to receive power from the battery such that the third controller can monitor system data of a generator system and communicate the data to other equipment associated with the generator system even when the third controller is not receiving power from the AC power supply.

6. The switch-mode power supply of claim 5, further comprising:
    an exciter field;
    a capacitor coupled to the exciter field, the capacitor configured to store power provided by the battery; and
    wherein the third controller is configured to provide an excitation current to the exciter field using the power stored on the capacitor when the third controller determines that a rotation of a rotor shaft of the synchronous brushless generator has commenced.

7. The switch-mode power supply of claim 1, wherein the transformer is configured to convert power from either the AC power supply or the DC power supply to an output of between a 3.3 volt level and a 15 volt level.

8. A system comprising:
    an alternating current (AC) power source comprising an AC generator;
    a direct current (DC) power source electrically isolated from the AC power source; and
    a switch-mode power supply comprising:
        a transformer comprising a first primary winding coupled to the AC power source, a second primary winding coupled to the DC power source, and a secondary winding configured to derive a main voltage output from the first and second primary windings;
        a first controller configured to drive the first primary winding to regulate a first voltage generated by rotation of the AC generator;
        a second controller configured to drive the second primary winding to regulate a second voltage output from the DC power source when the AC generator is not rotating, causing the transformer to not receive power from the AC power source; and
        an interlock signal isolator configured to generate an isolation barrier to electrically isolate the first controller from the second controller and the DC power source and allow logic information to pass therethrough, the interlock signal isolator configured to receive a first logic signal indicating that the DC power source is active and transmit a second logic signal commanding the first controller to deactivate while the DC power source is active.

9. The system of claim 8, wherein the AC power source is a permanent magnet generator that produces between 100-300 volts.

10. The system of claim 8, wherein the DC power source is a battery that produces 12 or 24 volts.

11. The system of claim 10, wherein the AC power source is a synchronous brushless generator that produces between 100-300 volts.

12. The system of claim 11, wherein the transformer further comprises a third controller configured to receive power from the battery such that the third controller can monitor data associated with a switch-mode power supply even when the third controller is not receiving power from the AC power source.

13. The system of claim 12, wherein the transformer further comprises
an exciter field;
a capacitor coupled to the exciter field, the capacitor configured to store power provided by the battery; and
wherein the third controller is configured to provide an excitation current to the exciter field using the power stored on the capacitor when the third controller determines that a rotation of a rotor shaft of the synchronous brushless generator has commenced.

14. The system of claim 8, wherein the transformer is configured to convert power from either the AC power supply or the DC power supply to an output of between a 3.3 volt level and a 15 volt level.

15. A transformer having a first primary winding coupled to an alternating current (AC) power source that includes an AC generator and a second primary winding coupled to a direct current (DC) power source, the AC power source being electrically isolated from the DC power source, the transformer comprising:
a first controller configured to drive the first primary winding to regulate a first voltage generated by rotation of the AC generator;
a second controller configured to drive the second primary winding to regulate a second voltage output from the DC power source when the AC generator is not rotating, causing the transformer to not receive power from the AC power source; and
an interlock signal isolator configured to generate an isolation barrier to electrically isolate the first controller from the second controller and the DC power source and allow logic information to pass therethrough, the interlock signal isolator configured to receive a first logic signal indicating that the DC power source is active and transmit a second logic signal commanding the first controller to deactivate while the DC power source is active.

16. The transformer of claim 15, wherein the AC power source is a permanent magnet generator that produces between 100-300 volts.

17. The transformer of claim 15, wherein the DC power source is a battery that produces 12 or 24 volts.

18. The transformer of claim 17, wherein the AC power source is a synchronous brushless generator that produces between 100-300 volts.

19. The transformer of claim 18, further comprising a third controller configured to receive power from the battery such that the third controller can monitor data associated with a switch-mode power supply even when the third controller is not receiving power from the AC power supply.

20. The transformer of claim 19, further comprising:
an exciter field;
a capacitor coupled to the exciter field, the capacitor configured to store power provided by the battery; and
wherein the third controller is configured to provide an excitation current to the exciter field using the power stored on the capacitor when the third controller determines that a rotation of a rotor shaft of the synchronous brushless generator has commenced.

* * * * *